UNITED STATES PATENT OFFICE.

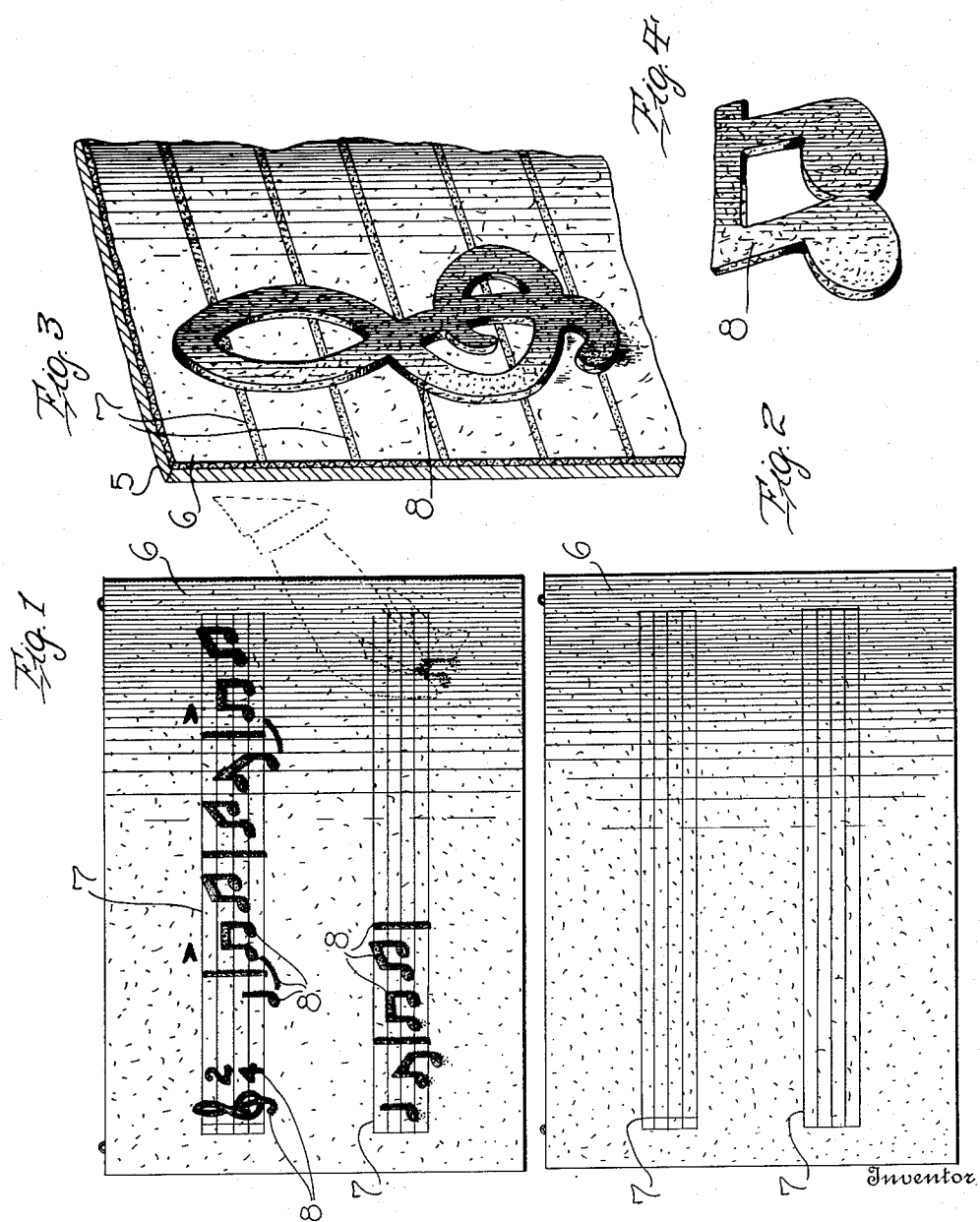

CLARA BLAKELY HUGHES, OF LAKOTA, NORTH DAKOTA.

EDUCATIONAL APPARATUS.

1,099,372.  Specification of Letters Patent.  Patented June 9, 1914.

Application filed July 16, 1913. Serial No. 779,336.

*To all whom it may concern:*

Be it known that I, CLARA B. HUGHES, citizen of the United States, residing at Lakota, in the county of Nelson and State of North Dakota, have invented certain new and useful Improvements in Educational Apparatus, of which the following is a specification, reference being had to the accompanying drawings.

This invention relates to improvements in educational apparatus and has for its primary object the provision of simple, inexpensive and efficacious means for imparting musical instruction to pupils.

It is another object of the invention to provide an educational apparatus embodying a chart, and musical notes or symbols adapted to be removably and replaceably mounted upon said chart.

Another and more specific object of the invention resides in the provision of a base having a surface of a high frictional character upon which one or more musical staves may be printed or otherwise delineated, and notes and musical symbols formed of felt or other material of a like fibrous character adapted to frictionally engage with and adhere to the face of the chart but capable of easy and quick removal therefrom.

With the above and other objects in view, the invention consists in the improved form and construction of the chart and its accompanying parts to be hereinafter specifically referred to, as illustrated in the preferred embodiment of my invention in the accompanying drawing, in which—

Figure 1 is a face view of the chart having the removable notes and symbols arranged thereon, as shown. Fig. 2 is a similar view, the symbols being removed from the chart. Fig. 3 is a detail sectional perspective view. Fig. 4 is a perspective view of one of the symbols.

In carrying out my invention, I provide a heavy card-board backing or base indicated at 5 having a face or surface to which the notes and symbols are designed to be applied which is of a high frictional character, or as illustrated, a sheet of felt or other fibrous material 6 may be secured upon the surface of the card-board base. I have found, however, that several forms of pastel board may be used with satisfactory results, and it is consequently to be understood that I do not desire to be limited to the use of the felt or fibrous sheeting as above referred to. Upon the card-board base or the felt sheet secured thereon, a plurality of music staves 7 are printed or otherwise depicted. The lines of the staves are dark enough to be readily discerned upon the comparatively light background while the musical notes and symbols shown at 8 when applied to the lines of the staff will be sharply outlined thereon and stand out clearly so that they can be read at a considerable distance from the chart. These notes and symbols 8 are cut out of felt preferably of a dark green color which is adapted to adhere to the surface of the base or backing of card-board or the felt facing sheet secured thereon. The chart may be hung upon a wall with the notes applied thereto without liability of displacing the notes from their proper positions.

In the use of my invention, after hanging the chart upon a wall or otherwise suspending the same, the pupil applies the felt notes to the proper lines or spaces upon the staff as they are named by the instructor and after the staff has been filled, it will be understood that the notes and symbols may be readily removed therefrom and placed in different positions. Also by the provision of the removable notes, the instructor may write out a lesson for the pupil, to be worked out, and the notes properly applied to the surface of the chart during the interim between the visits of the instructor.

From the foregoing, it is thought that the construction and manner of use of my improved musical instruction chart will be clearly and fully understood.

The invention provides a very simple and inexpensive means for imparting musical instruction which will be found highly satisfactory and efficacious in practical use.

While I have particularly referred in the foregoing to the use of the invention as a musical instruction chart, it will be appreciated that the device may also be employed for various other analogous educational purposes.

Having thus described the invention, what is claimed is:

1. A chart having a face of a highly frictional nature, and symbols constructed of felt adapted to adhere to the face of the chart when pressed against the same.

2. A chart comprising a base, a felt sheet secured upon the face of said base, and symbols also constructed of felt and adapted to frictionally adhere to the felt sheet upon the base when pressed against the same.

In testimony whereof I hereunto affix my signature in the presence of two witnesses.

CLARA BLAKELY HUGHES.

Witnesses:
ALLAN A. McMASTER,
LEE BOLSTER.